United States Patent
van Dinteren et al.

[11] Patent Number: 5,909,093
[45] Date of Patent: Jun. 1, 1999

[54] REMOTELY CONTROLLED BLIND ARRANGEMENT

[75] Inventors: Ad P. M. van Dinteren, Best; Hendrik F. W. van Roy, Lage Mierde, both of Netherlands

[73] Assignee: Hunter Douglas International N.V., Antilles, Netherlands

[21] Appl. No.: 08/969,243

[22] Filed: Nov. 13, 1997

[30] Foreign Application Priority Data

Nov. 13, 1996 [EP] European Pat. Off. ............ 96203174

[51] Int. Cl.⁶ ..................................................... E06B 9/26
[52] U.S. Cl. .......................... 318/16; 318/286; 318/468; 318/480; 49/25
[58] Field of Search ............................. 318/16, 264, 265, 318/266, 286, 291, 293, 294, 466, 467, 468, 469, 480; 49/25

[56] References Cited

U.S. PATENT DOCUMENTS

| | | |
|---|---|---|
| 4,531,237 | 7/1985 | Bar-on et al. . |
| 4,618,804 | 10/1986 | Iwasaki . |
| 4,761,830 | 8/1988 | Izumi . |
| 4,857,917 | 8/1989 | Sato . |
| 4,979,550 | 12/1990 | Long et al. . |
| 5,081,402 | 1/1992 | Koleda . |
| 5,115,236 | 5/1992 | Kohler . |
| 5,134,347 | 7/1992 | Koleda . |
| 5,270,629 | 12/1993 | Hsieh ........................................ 318/600 |
| 5,554,979 | 9/1996 | Kohar et al. . |
| 5,603,371 | 2/1997 | Gregg ..................................... 160/176.1 |
| 5,793,174 | 8/1998 | Kovach et al. ........................... 318/468 |

FOREIGN PATENT DOCUMENTS

| | | |
|---|---|---|
| 2166574 | 5/1997 | Canada . |
| 452154 | 10/1991 | European Pat. Off. . |
| 457964 | 11/1991 | European Pat. Off. . |
| 559930 | 9/1993 | European Pat. Off. . |
| WO 9621286 | 7/1996 | WIPO . |

*Primary Examiner*—Bentsu Ro
*Attorney, Agent, or Firm*—Dorsey & Whitney LLP

[57] ABSTRACT

A remotely controlled blind arrangement comprises a head rail with an operating member for operation the blind arrangement. The blind arrangement can be controlled by means of a remote control device and is powered by a power supply such as for instance a battery. According to the invention the blind arrangement comprises a wake-up circuit for periodically switching the processor unit between an active status and a sleep status. The processor unit periodically calibrates the wake-up unit to maintain a constant period wake-up signal. Hereby the wake-up circuit can be made from relatively cheap components and drifts of the wake-up signal due to the decreasing battery power or temperature influences can be reduced. In an embodiment according to the present invention the processor unit is adapted to disregard the signal of the transmitter when the blind has a fully tilted, fully deployed or fully retracted position for further energy saving.

14 Claims, 6 Drawing Sheets

REMOTELY CONTROLLED BLIND ARRANGEMENT

The invention underlying the present disclosure relates to a remotely controlled blind arrangement comprising a head rail with an operating member for operating the blind arrangement, and a communication system with a transmitter and a receiver each provided with a supply unit, the transmitter being incorporated in a remote control device and the receiver, responsive to a signal of the transmitter to drive the operating member, comprising a detection unit, a processor unit and a wake-up unit for periodically switching the processor unit between an active status and a sleep status by means of a periodic wake-up signal.

Such a remotely controlled blind arrangement may be a slatted arrangement or a shade arrangement, and can be used in home and office applications, in particular on locations where manual control is somewhat impractical.

Such a remotely controlled blind arrangement is known inter alia from the general art and public sale. To reduce (electrical) power consumption such a remotely controlled blind arrangement may be provided with a so called sleeping-dog system, so as to switch the receiver periodically between an active status and a sleep status. When the receiver of a sleeping-dog system enters the active status, first the receiver as a whole is provided with power from the supply unit, which may be mains or battery supplied. Then, after a settling-time during which proper biasing of the detection and the processor unit is achieved, the receiver is enabled to check whether a signal is being transmitted by the transmitter and whether the signal is indeed destined for the receiver; such a signal is hereinafter referred to as valid. If a signal is being transmitted but invalid, the receiver returns to the sleep status after a while. Same occurs in absence of a signal. In contrast, if a signal is valid, the receiver remains powered for a time at least as long as the signal remains valid. During the sleep status, when power consumption is reduced as opposed to the active status, the receiver is not susceptible for a signal. To avoid a considerable response-time of the communication system the sleep status should accordingly have an appropriate duration.

An energy saving arrangement for a signal receiver, for instance for a battery-operated radio equipment, wherein the receiver is periodically switched on and off by an external oscillator to provide a low duty cycle is known from U.S. Pat. No. 4,531,237.

A disadvantage of such a remotely controlled blind arrangement nevertheless is that power consumption is still considerable despite use of the "sleeping-dog" system, which is particularly undesirable if the receiver is battery supplied.

Furthermore the period of the oscillator for switching on and off the receiver can vary, due to temperature effects, aging of the components or other drift mechanisms.

The invention has as an object to provide a remotely controlled blind arrangement, which arranges for further reduced power consumption. It is a further object of the present invention to provide a remotely controlled blind arrangement which can be manufactured from relatively cheap components, which has accurately determined active and sleep periods and which is relatively insensitive to drifts due to for instance decrease in battery power or ambient fluctuations.

A remotely controlled blind arrangement in accordance with the present invention is thereto characterised in that the processor unit periodically calibrates the wake-up unit to maintain a constant period wake-up signal.

As acknowledged by the invention, the active/sleep-ratio is an important parameter determining power consumption. When the sleep status would somewhat decrease in time, which may happen due to several parasitic circuitry effects, such as supply and temperature variations, the active/sleep-ratio worsens and power consumption increases. Retaining the sleep status at a constant period of time is consequently important, which is achieved in the present embodiment by the calibration of the wake-up unit by means of the processor unit. Such calibration arranges for a constant time for the sleep status, while time for calibration is as long as required but as short as possible. Power consumption for such calibration is rather positive when considering the constant time of the sleep status on the one hand against an extension of the active status on the other hand; the extension results since time for calibration is part of the active status. Due to the regular calibration the intrinsic inaccuracies in the components in the wake-up circuit can be compensated for. Thereby "standard" components can be used without having to resort to very accurate and therefor expensive components. Furthermore can the drift in the active/sleep ratio due to changing battery power be compensated. The response time of the wake-up circuit is therefor substantially independent of the battery power. Also drifts in temperature and other environmental factors can be compensated during the calibration. Hence a reliable and accurate wake-up circuit is provided according to the present invention with the use of cheap components.

An embodiment of a remotely controlled blind arrangement may further be characterised in that the processor unit comprises an output that is connected to an input of the wake-up circuit comprising a capacitive element, for supplying a charging pulse to said capacitive element, the wake-up signal at the output of the wake-up circuit being determined by the discharge time of the capacitive element, wherein in the calibrating step the processor unit determines the period of the wake-up signal and adjusts the width (Tc+nΔT) and/or the period of the charging pulse to maintain a predetermined period of the wake-up signal. During signal detection, the processor unit charges the capacitive elements of the wake-up circuit before switching off. After a specific amount of discharge of the capacitive elements, the wake-up circuit switches on the processor unit according to the present invention. In the calibrating step, the processor unit verifies if the wake-up time of the wake-up circuit has been changed, i.e. if the time between the arrival of the changing pulse at the capacitive elements and the moment when an output signal is formed at the output of the wake-up circuit has been changed. If such a change in the wake-up-period has been detected, the processor unit varies its charging pulse characteristics, preferably by adjusting the width thereof in for instance 16 steps of 96 μs each to readjust the wake-up signal period to its predetermined and constant value.

In a further embodiment of a remotely controlled blind arrangement according to the present invention, the input of the wake-up unit is connected to the control electrode of a controllable switch, the capacitive element being with one terminal connected to the control electrode and with another terminal to a reference voltage, the output of the wake-up circuit being connected to an output electrode of the controllable switch. The discharging of the capacitive elements controls the controllable switch, which may be formed by a transistor, whereby the output voltage at the collector of the transistor may be switched between a supply voltage and between a voltage drop over a resistive element connected thereto when the switch is turned on. For obtaining steep flanks of the wake-up circuit signals, the output electrode of the controllable switch may be connected to a control electrode of a second controllable switch, the output electrode of which is connected to the control electrode of the first switch. In this way a Schmitt-trigger arrangement is formed with sleep pulse flanks.

The detection unit may be adapted to switch periodically between an active status and a sleep status, during the active status the detection unit requiring a short settling-time to be able to respond to the signal, allowing an active/sleep-ratio smaller than one to four. The active/sleep-ratio represents a minimum time for the active status in relation to a constant time for the sleep status. The active status has a variable time, since the required time depends on the signal that is received.

A receiver consumes relatively much power to check only whether or not a signal is present and indeed valid. A considerable quantity of power appeared to be consumed by the detection unit, as a significant settling-time is involved in the known art, before detection of a signal can take place. The settling-time and a minimum time for detection of a signal form the minimum time for the active status. The invention accordingly proposes to use a short settling-time to arrange for further reduced power consumption. The invention concurrently proposes to switch at least the processor unit, or both the processor unit and the detection unit.

A remotely controlled blind arrangement in accordance with the invention preferably incorporates low capacitive elements. Reduction of capacitive elements in the detection unit establishes the shortened settling-time.

The detection unit in a remotely controlled blind arrangement in accordance with the invention may be immediately switched into the sleep status after detecting that the signal is not valid. Where the known art teaches a fixed pre-determined minimum time for the active status, the present embodiment proposes to terminate the active status immediately after a signal appears invalid. Alternatively the active status may be terminated after a signal appears either absent or invalid. The subject embodiment clearly results from the view underlying the invention, that reduction of activity of the detection unit reduces power consumption considerably.

A remotely controlled blind arrangement in accordance with the invention may further be characterized in that the processor unit is adapted to disregard the signal of the transmitter when the blind arrangement is in a pre-determined position. Power consumption evidently benefits from prevention of over-acting. For example, when slats of a slatted arrangement are positioned in an fully tilted blind position, using power to further tilt said slats is in vain and would be wasted. Similarly, a shade arrangement that is fully extended, can not be further extended by applying additional power.

Thus, the pre-determined position may relate to a fully tilted blind position or the pre-determined position may relate to a fully deployed or retracted blind position.

A remotely controlled blind arrangement in accordance with the invention may be provided with a manual operation equipment, such as a manual tilt or lift control. Obviously provision of the manual operation equipment leads to use of the equipment, which reduces power consumption.

Above-mentioned and other (more detailed) aspects of the invention are further described and illustrated with reference to the accompanying drawing, wherein.

In the figures corresponding parts are referred to by similar reference signs.

Figure 1:
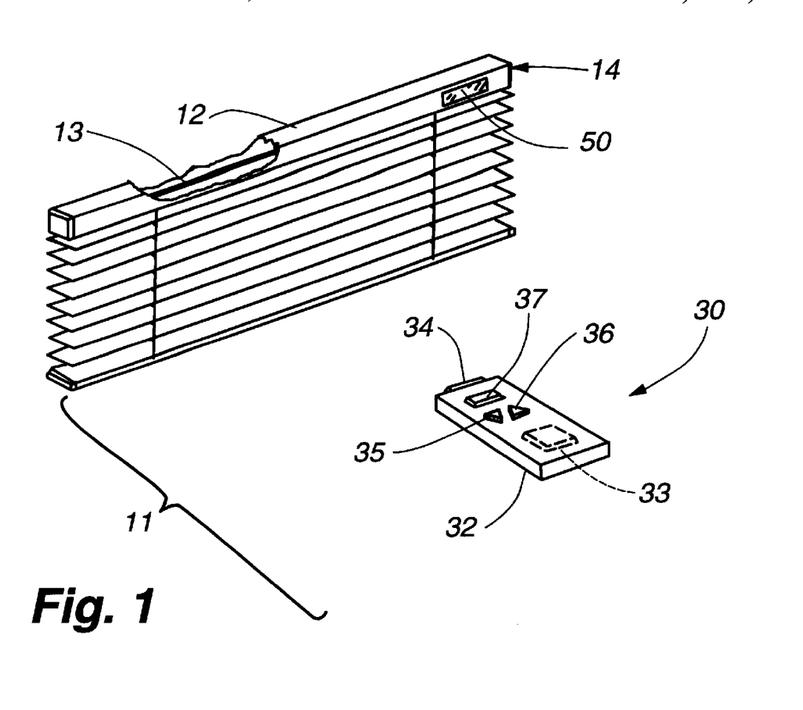
FIG. 1 shows a partially broken away perspective view of an embodiment of a remotely controlled blind arrangement in accordance with the invention.

In FIG. 1 a partially broken away perspective view of an embodiment of a remotely controlled blind arrangement in accordance with the invention is shown. The embodiment relates to a horizontal slatted blind arrangement 11 incorporating a head rail 12, an operating member 13 and some slats 14. The operating member 13, which is hereinafter referred to as a rod and may be a rotatable element of any length or size, is used for operation of the blind arrangement, particularly to tilt the slats 14. In accordance with the invention the shown arrangement is provided with a communication system with a transmitter 30 and a receiver 50 each provided with a supply unit (hereinafter referred to as 31 and 51, respectively). The communication system may use any signals, such as infra-red or radio-frequency signals. The transmitter 30 is incorporated in a remote control device 32 and provided with a processor unit (schematically referred to as 33) and a emission element 34, as well as with a first button 35, a second button 36, and an address switch 37. In the embodiment the first button 35 is represented as a down button which relates to tilting the slats 14 in a pre-determined direction; alternatively the second button 36 is represented as an up button which relates to tilting the slats 14 in an opposite direction. The transmitter 30 and the receiver 50, as well as each relevant part thereof, are explained in more detail with reference to hereinafter described figures.

Figure 2:
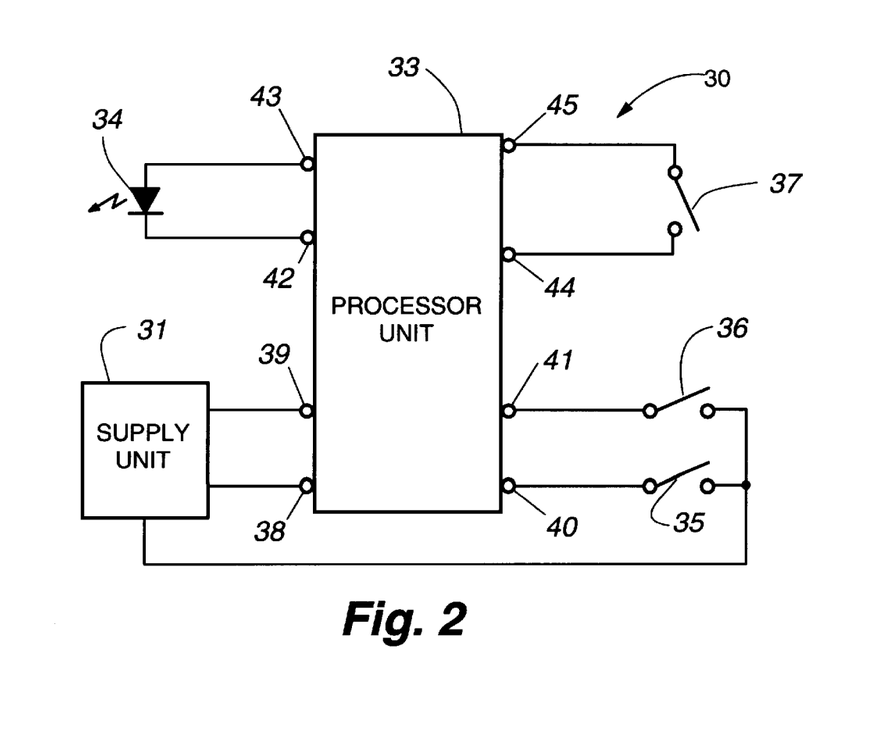
FIG. 2 shows a schematic diagram of a transmitter for use with the embodiment of a remotely controlled blind arrangement in accordance with the invention.

In FIG. 2 a schematic diagram of a transmitter for use with the embodiment of a remotely controlled blind arrangement in accordance with the invention is shown. The schematic diagram shows the supply unit 31, the processor unit 33, the emission element 34, the down and up buttons 35 and 36, respectively, and the address switch 37. The processor unit 33, which may include a crystal or a resonator to arrange for accurate timing, is schematically provided with supply terminals 38 and 39, to which terminals the supply unit 31 is coupled, and input terminals 40 and 41, to which terminals the supply unit 31 is coupled through the down and up buttons 35 and 36, respectively. The supply unit 31 may be mains, but is preferably battery supplied. To transmit a signal the processor unit 33 is further provided with output terminals 42 and 43, to which terminals the emission element 34 is coupled, and address terminals 44 and 45, between which terminals the address switch 37 is coupled. The emission element 34 may be embodied as one or more light emitting diodes (LED's).

As soon as one of the down and up buttons 35 and 36 is touched, the processor unit 33 leaves a sleep mode to enter into an active mode, receiving full power from the supply unit 31. When the down button 35 is touched, the processor unit 33 generates and the transmission element 34 transmits a first signal, for example to enable the receiver 50 to establish that the slats 14 tilt in the predetermined direction. In contrast, when the up button 36 is touched, the processor unit 33 generates and the transmission element 34 transmits a second signal, for example to enable the receiver 50 to establish that the slats 14 tilt in the opposite direction. The address switch 37, which may be a two-position switch, is available to change address information that may be incorporated in the first and second signals. Such address information is capable of distinguishing between operation of adjacent blind arrangements. After release of the touched button 35 or 36 the processor unit 33 returns to the sleep mode, requiring very low power consumption, since only quiescent currents supply the transmitter 30.

Figure 3:
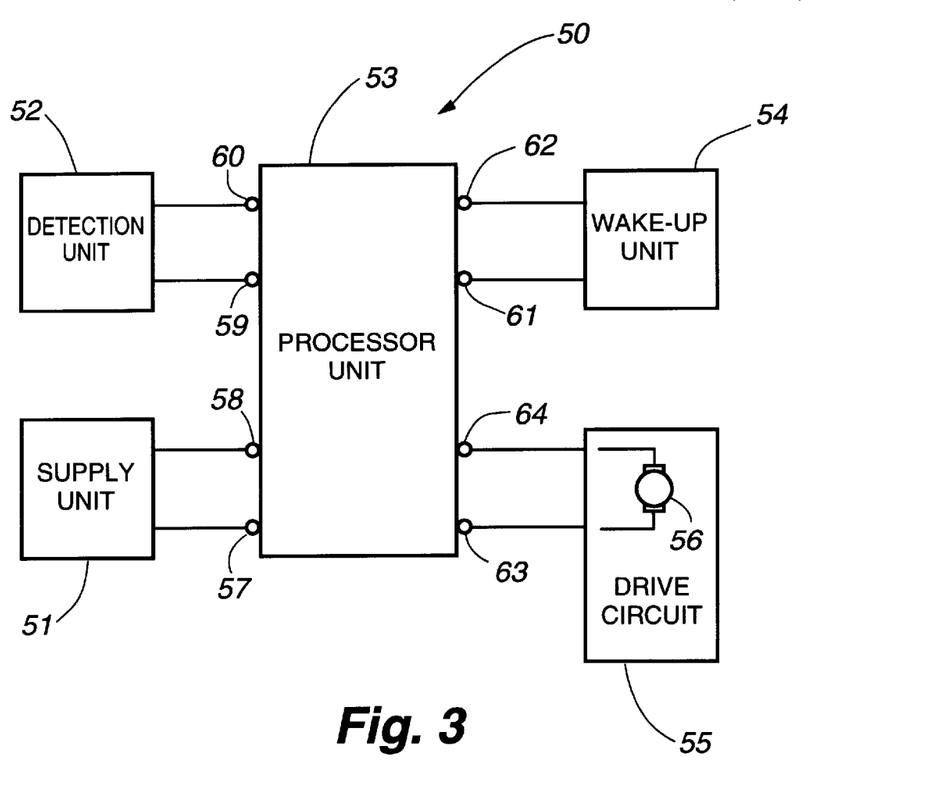
FIG. 3 shows a schematic diagram of a receiver for use with the embodiment of a remotely controlled blind arrangement in accordance with the invention.

In FIG. 3 a schematic diagram of a receiver for use with the embodiment of a remotely controlled blind arrangement in accordance with the invention is shown. The schematic diagram shows the supply unit 51, a detection unit 52, a processor unit 53, a wake-up unit 54, and a drive circuit 55 for a motor 56. The processor unit 53, which may incorporate a crystal or a resonator to arrange for accurate timing, is schematically provided with supply terminals 57 and 58, to which terminals the supply unit 51 is coupled, input terminals 59 and 60, to which terminals the detection unit 52 is coupled, and input terminals 61 and 62, to which terminals the wake-up unit 54 is coupled. The supply unit 51 may be mains, but is preferably battery supplied, to avoid external wiring with installation of blind arrangements. The processor unit 53 is further provided with output terminals 63 and 64, to which terminals the drive circuit 55 for the motor 56 is coupled. The drive circuit 55 may be constructed as a bridge circuit, which is well known to a skilled man, allowing the motor 56 to turn in both directions, thereby arranging for the slats 14 to tilt in the pre-determined or the opposite direction. To arrange for aforesaid, the motor 56 may be coupled to the rod 13 in any conventional way, for example through a gear box.

In the referred to embodiment the wake-up unit 54 is capable of changing the detection unit 52 from a sleep status into an active status through terminals 61 and 59 of the processor unit 53, by activating and deactivating the processor unit 53. To arrange for adequate switching into the active status the wake-up unit 54 may incorporate a so called Schmitt trigger circuit, which is well known to a skilled man. In the active status the detection unit 52 is capable of receiving a signal, particularly the above mentioned first or second signal, and to drive the processor unit 53 through terminal 60. To achieve fast response times the detection unit 52 arranges for a short settling-time, a time required to bias the detection unit. The short settling-time is established by using only low capacitive elements in the detection unit 52. As an example, a Sharp GP1U90X chip which incorporates an infra-red detector and comprises an adaptable capacitor, can be used while replacing the adaptable capacitor by a capacitive element of a few nano-Farad, preferably one nano-Farad.

When the processor unit 53 is driven by the detector unit 52 in response to a signal, the received signal is checked on validity for the receiver 50. Such a signal may consist of digital data slots of, for example, nine bits comprising two leading bits, four information including address bits, and three terminating bits. Such validity check may involve any known principle, such as a slot composition or a pulse width check. The referred to embodiment is constructed to leave immediately the active status if a signal is either absent or invalid. If a signal is valid, and thus equals the first of the second signal, the processor unit 53 gives direction commands to the drive circuit 55 through terminal 63. Then the drive circuit 55 controls the motor 56 and drives the rod 13 and tilts the slats 14 in the pre-determined or the opposite direction. While direction commands are given, terminal 64 enables the processor unit 53 to learn about positions of the blind arrangement. For example, the drive circuit 55 may comprise a current sensing circuit which notices increased current through the motor 56. Such increased current occurs when the blind arrangement is in an end position, more in particular an ultimate tilt position. While the processor unit 53 can respond to said increased current by disconnecting power to the motor 56, a subsequent command to turn the motor 56 in same direction is disregarded to reduce power consumption and to guard against overload damage.

As soon as the received signal fades away or becomes invalid, the processor unit 53 starts calibration of the wake-up unit 54, so as to arrange for a constant time for the sleep status. During such calibration the detection unit 52 is preferably capable of dealing with any new signal, to respond quickly to further data slots for more accurate adjustment of the rod 13 and the slats 14. When calibration ends, the processor unit 53 resets the wake-up unit 54 through terminal 62, and the detection unit 52 as well as the processor unit 53 both return to the sleep status, during which status only little power is consumed from the supply unit 51, since only quiescent currents supply tne receiver 50.

Figure 4A:
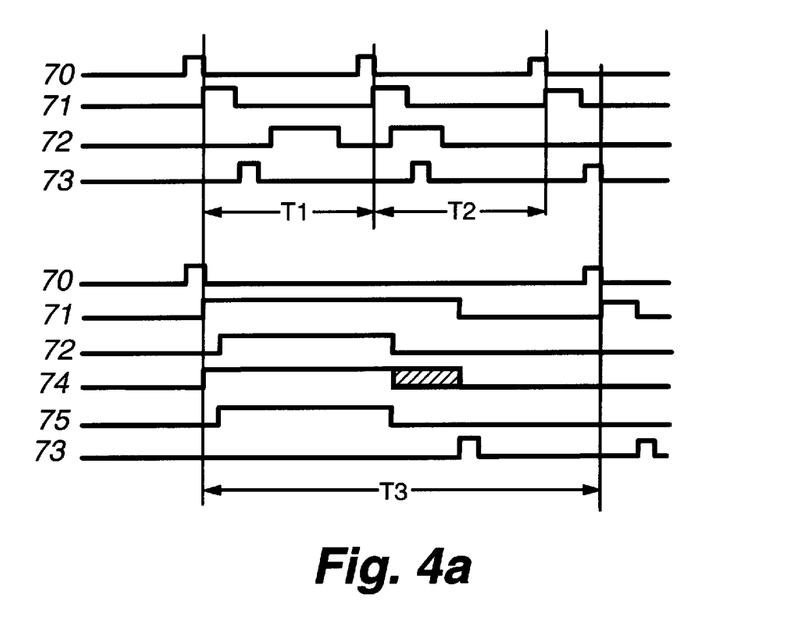
FIG. 4a shows a first timing diagram of an embodiment of a remotely controlled blind arrangement in accordance with the invention.

In FIG. 4a a first timing diagram of the embodiment of a remotely controlled blind arrangement in accordance with the invention is shown. The timing diagram shows signals 70 to 73 during periods T1 and T2, and signals 70 to 75 during period T3. Signal 70 is generated by the wake-up unit 54 to activate the processor unit 53 (and thereby the detection unit 52), signal 71 represents the respective statuses of the detection unit 52, signal 72 is a signal as received by the receiver 50, signal 73 is generated by the processor unit 53 to reset the wake-up circuit 54, signal 74 represents the respective statuses of the processor unit 53, and signal 75 is generated by the processor unit 53 to drive the drive circuit 55 including the motor 56.

Signals 70, 71, 72, 73 and 75 are present at terminals 61, 59, 60, 62 and 63, respectively, of FIG. 3.

Each period (T1, T2, T3) comprises the active and the sleep status, the active status being initiated by a negative flank of signal 70 generated by the wake-up unit 54, and the sleep status being entered by a positive flank of signal 73 generated by the processor unit 53, resetting the wake-up unit 54. Where the timing diagram does not show real times, nor real inter-relations of times, the minimum time for the active status may be about 6.4 milli-second, which minimum time is achieved with the above mentioned chip and capacitive element, while the constant time for the sleep status may be about 750 milli-second, which constant time is suitable for an adequate response time of the communication system. An active/sleep-ratio of one to hundred-seventeen is accordingly achieved. As an indication, the minimum time for the active status may then consist of a short settling-time of 4 milli-second and a minimum time for detection of a signal of 2.4 milli-second.

During period T1, in response to the negative flank of signal 70, signal 71 is activated, then representing the active status of the detection unit 52. During the active status, which should be appropriate to check one data slot or part thereof, signal 72 is checked. Here, signal 72 is low when checked, so the active status remains for the minimum time. Subsequently the processor unit 53 activates signal 73 to reset the wake-up unit 54 and the detection unit 52 and the processor unit 53 return to the sleep status.

During period T2, signal 72 represents invalid data slots. When signal 71 is activated, then representing the active status of the detection unit 52, invalid data slots 72 are detected. After the minimum time for the active status, including the short settling-time and the minimum time for detection of a signal, the processor unit 53 terminates the active status: the processor unit 53 activates signal 73 to reset the wake-up unit 54 and the detection unit 52 and the processor unit 53 return to the sleep status.

During period T3, signal 70 of the wake-up unit 54 activates signal 71, setting the detection unit 52 from the sleep status into the active status. As signal 72 contains valid data slots, the processor unit 53 handles the received signal, which is represented with signal 74. As long as valid data slots are received and no fully tilted blind position is achieved, the processor unit 53 controls the drive circuit 55 by signal 75. Afterwards, the processor unit 53 calibrates the wake-up unit 54 (hatched) and then the detector unit 52 and the processor unit 53 leave the active status. Again, the processor unit 53 activates signal 73 to reset the wake-up unit 54 and the detection unit 52 and the processor unit 53 return to the sleep status.

Figure 4B:
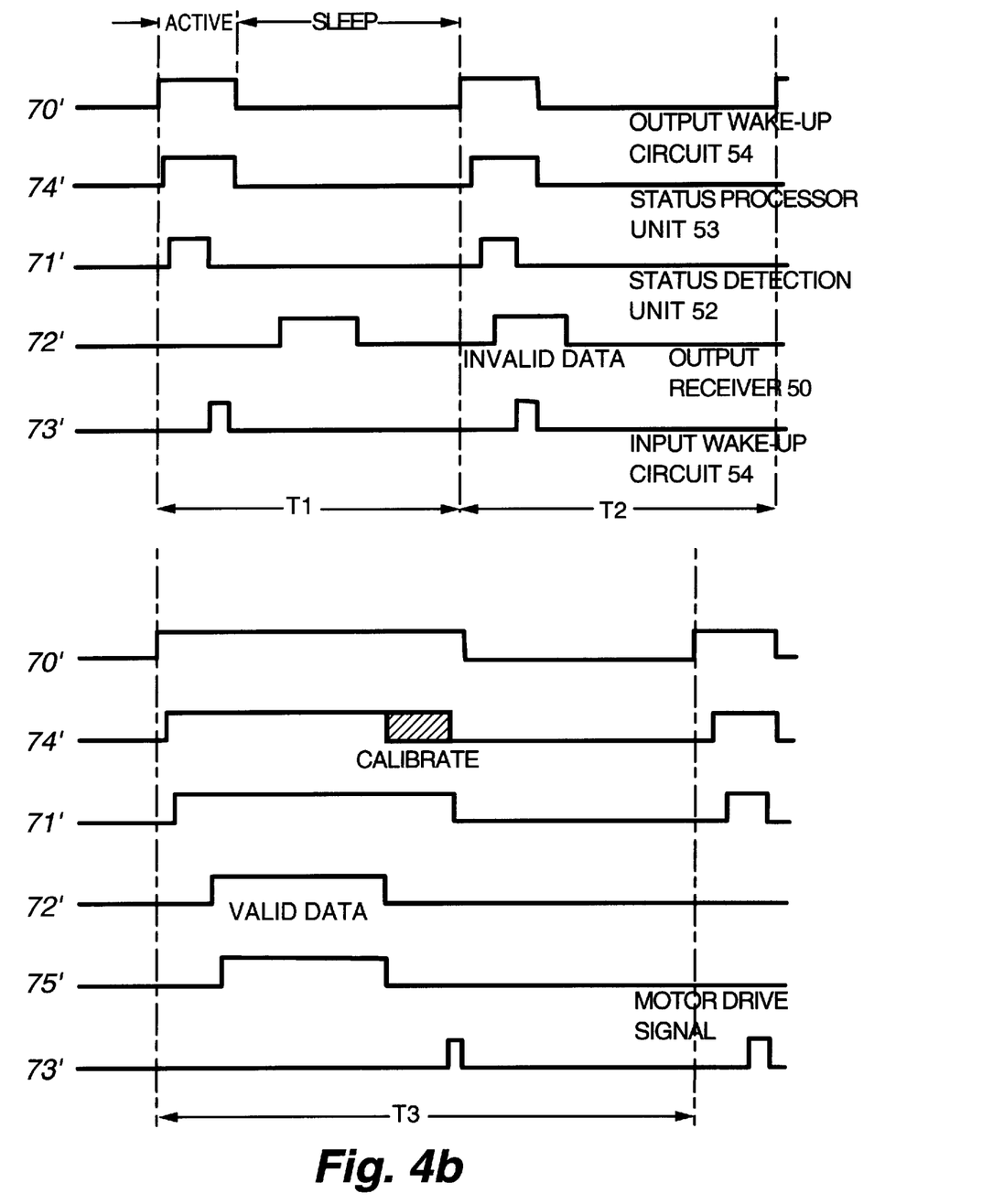
FIG. 4b shows a second timing diagram of a remotely controlled blind arrangement comprising the wake-up circuit according to FIG. 6.
Figure 6:
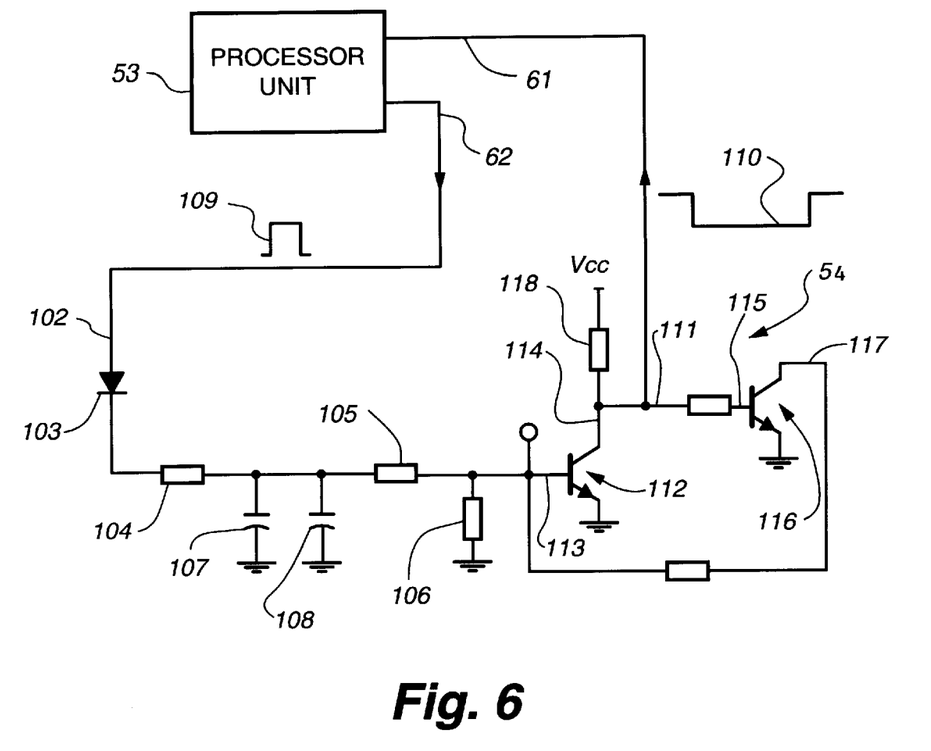
FIG. 6 shows the details of the wake-up circuit, FIGS. 7a,b and c respectively show the charging pulse $T_c$ at the microprocessor output, the voltage on the capacitive element of the wake-up circuit and the wake-up $T_w$ signal during the calibration step.

FIG. 4*b* shows the timing diagram of an embodiment of the remotely controlled blind arrangement wherein the wake-up circuit according to FIG. 6 is used. In the timing diagram of FIG. 4*b* the signal 70' corresponds to the output of the wake-up circuit 54. The signal 71' corresponds to the status of the detection unit 52. The signal 72' corresponds to the output of the receiver 50. The signal 73' corresponds to the input signal for the wake-up circuit 54. Signal 74' corresponds to the status of the processor unit 53, and signal 75' corresponds to the motor drive signal from the processor unit 53. As can be seen from FIG. 4*b*, the active status of the processor unit 53 is initiated by a positive flank of the wake-up circuit signal 70'. In the last part of the active period of the processor unit 53, a pulse 73' is supplied to the wake-up circuit 54 which pulse initiates the sleep status of this circuit by making signal 70' go low. This sleep status is ended when the input transistor 112 of the wake-up circuit 54 (see FIG. 6) becomes non-conducting and the output 111 of the wake-up circuit becomes high again. In the timing diagram of FIG. 4*b* it is shown that if invalid data arrives during the active status of the detection unit 52, (represented by signal 71'), the processor unit 53 returns to the sleep status as would be the case for time period T1 when data arrives during the sleep status of the detection unit 52.

From the above timing diagram it is clear that the positive flank of the wake-up circuit signal 70' activates the processor unit 53, which in turn switches the detection unit 52 to its active status (see signal 71').

During the period T3 it can be seen that the status of the detection unit 52, represented by signal 71' remains high when a valid data signal 72' is present at the output of the receiver 50 during the active period. After the valid data signal vanishes, the processor unit 53 executes a calibrating step as indicated by the hatched part of the signal 74'. During the calibration time, the detection unit 52 remains in its active state as indicated by signal 71'. At the end of the calibration period the microprocessor unit 53 sends another charging pulse to the wake-up circuit 54 as indicated by signal 73'. Hereby the output of the wake-up circuit 54, indicated by signal 70' becomes low.

FIG. 6 shows the wake-up circuit 54 connected with its input 102 to the output 62 of the processor unit 53. The output 111 of the wake-up unit 54 is connected to the input 61 of the processor unit 53. During the calibrating step shown by the hatched part of the status of the processor unit, shown under reference numeral 74 in FIG. 4, a charging pulse 109 is supplied to capacitive elements 107,108 via the low leakage type diode 103. As the low leakage diode 103 has a leaking current of not more than a few $\mu$ A the capacitive elements do not effectively discharge back to the processor unit 53. The capacitive elements 107,108 may be in the order of magnitude of a few hundreds of nF such as for instance 500 nF. The charging pulse 109 is supplied via the resistive elements 104,105 and 106 to the control electrode 113 of transistor 112. The collector of transistor 112 is connected to a supply voltage VCC via a resistor 118. The collector 114 is connected to the base 115 of transistor 116, which has its collector connected to the base 113 of the transistor 112 via a resistive element. After the charging pulse 109 has charged the capacitors 107,108 these capacitors will discharge via resistors 105 and 106, the voltage across the capacitor 107,108 is shown in FIG. 7*b*. When the base voltage of transistor 112 drops below the threshold voltage, the transistor will become non-conducting and the output signal 110 at the output 111 will become high. The high output 111 will put the transistor 116 in its conducting state such that the base voltage of transistor 112 is drawn low and a steep switching flank is obtained.

Figure 7A:
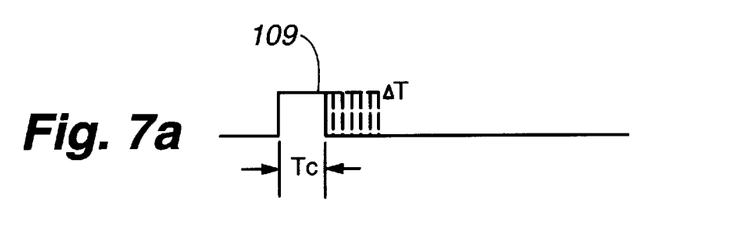
Figure 7B:
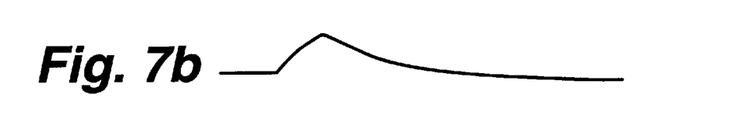
Figure 7C:
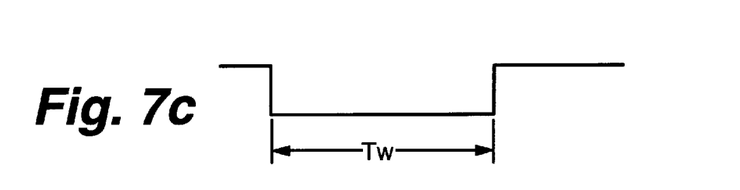

The charging pulse 109 supplied by the output 62 of the processor unit 53 is shown in FIG. 7*a*. The pulse width $T_c$ can be varied with incremental steps n$\Delta$Tn which may be for instance 16 steps of 96 $\mu$s each. FIG. 7*c* shows the wake-up signal at the output 111 of the wake-up circuit 54. By adjusting the pulse width of the charging pulse 109, the wake-up time $T_w$ may be compensated to maintain it at a constant value of for instance 750 ms. During the calibration step, the detector 59 is maintained in its switched on state as shown in FIG. 4 such that the user does not notice any delay period during adjustment of the blinds during the calibration stage.

Figure 5:
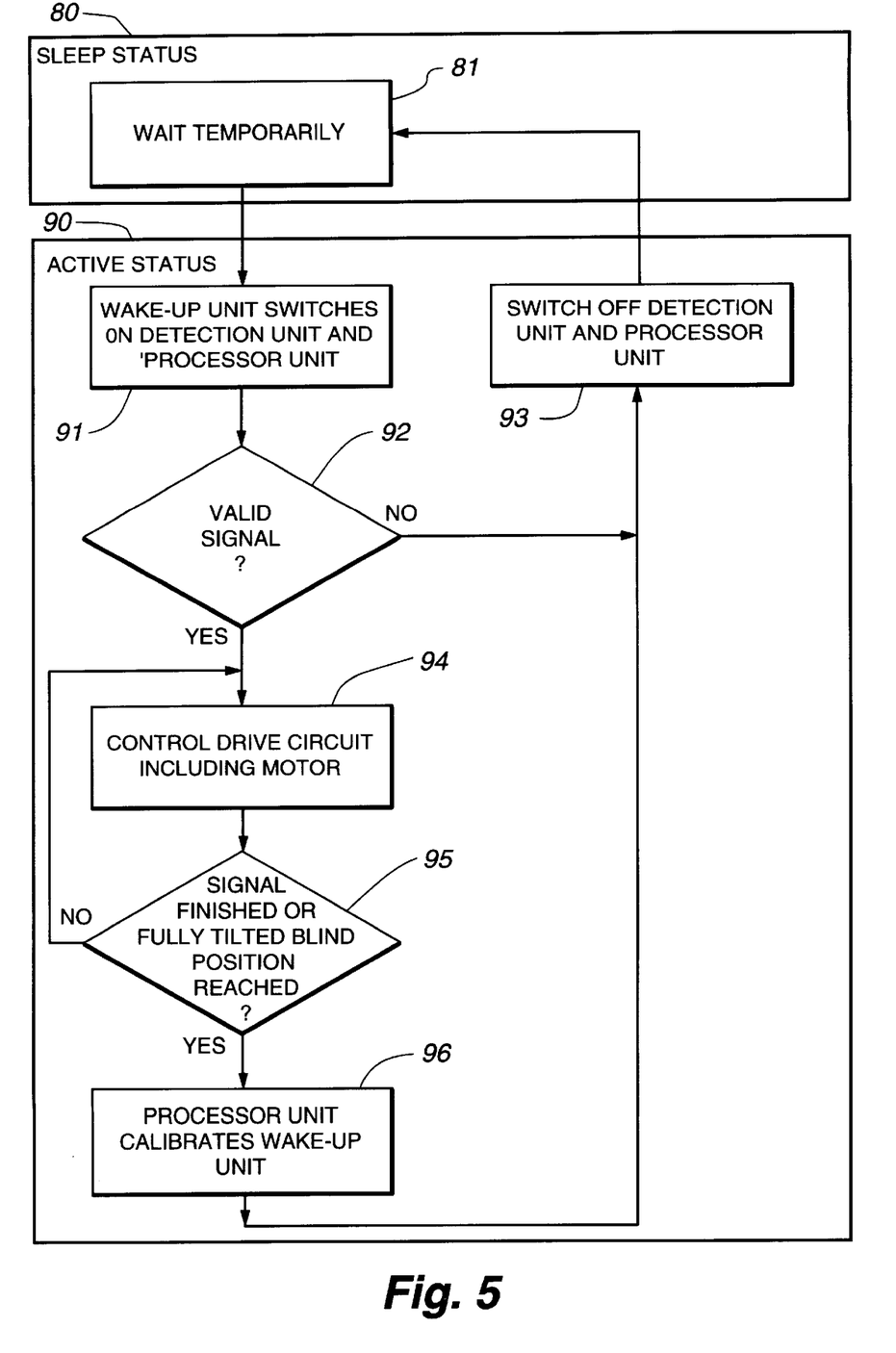
FIG. 5 shows a flow diagram of the receiver for use with the embodiment of a remotely controlled blind arrangement in accordance with the invention.

In FIG. 5 a flow diagram of the receiver for use with the embodiment of a remotely controlled blind arrangement in accordance with the invention is shown. The flow diagram should be read while referring to the attached table. The subject diagram shows a sleep status 80 and an active status 90. Where the sleep status 80 only includes a single step 81, the active status 90 provides a few steps, 91 to 96. After the step 81 (the sleep status), in the step 91 the wake-up unit 54 switches on the detection unit 52 and the processor unit 53 (the active status). Then the step 92 questions whether a (valid) signal is present. If invalid, in the step 93 the detection unit 52 and the processor unit 53 are switched off and the receiver 50 returns to the sleep status. If valid, in step 94 the processor unit 53 controls the drive circuit 55 including the motor 56 and arranges for control during one data slot; the step 95 questions whether the signal is finished or a fully tilted blind position is reached, providing a loop (steps 94 and 95, respectively).

Figure 8A:
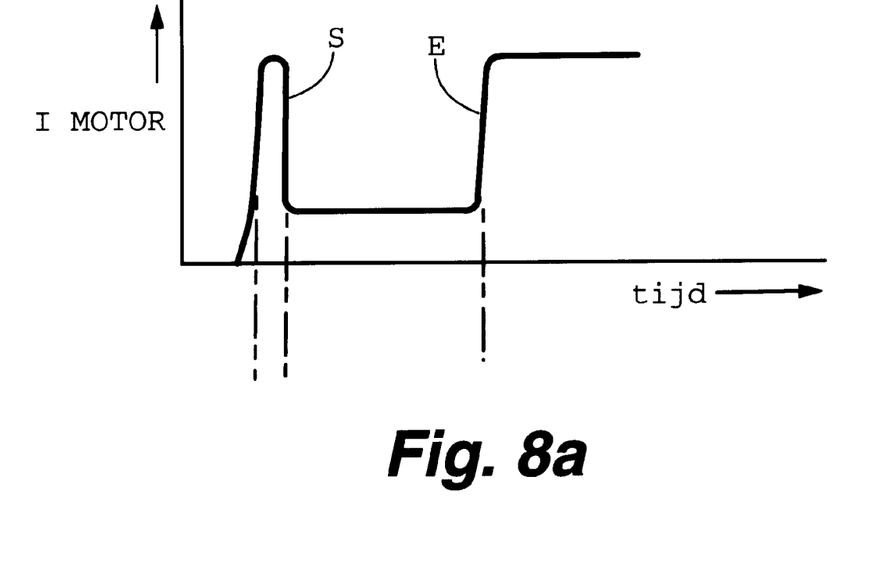
FIGS. 8a and 8b show the motor current during start up and reaching an end position and an internal motor end signal of the processor unit respectively.
Figure 8B:
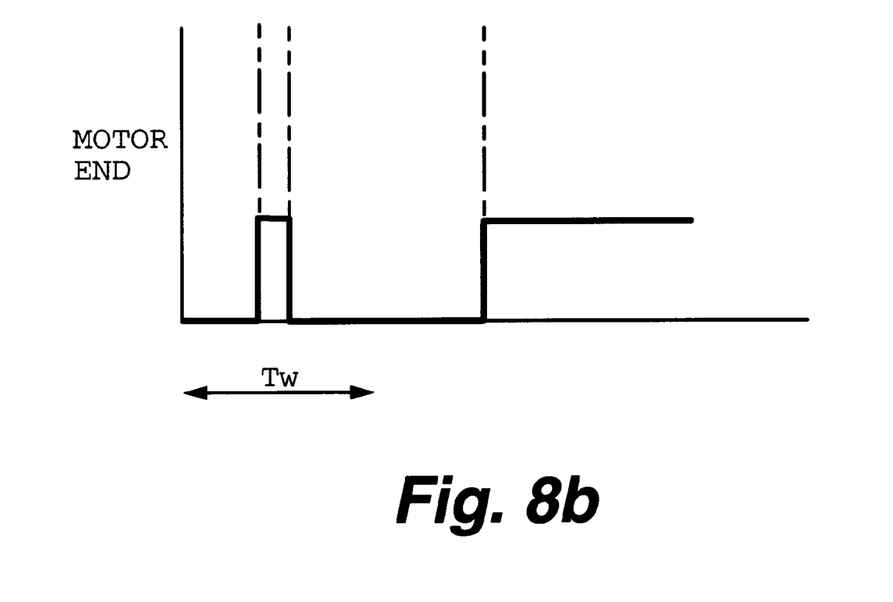

For determining if a maximum blind position is reached, the processor unit 53 receives at its input 64 a signal representative of the motor current, as shown in FIG. 8*a*. As shown in FIG. 8*a* at start up of the motor, indicated with S in FIG. 8*a*, a peak in the motor current occurs. Also when the motor reaches its end position, the motor current will increase as shown at I in FIG. 8*a*. In the microprocessor unit 53 a memory element is set when the motor reaches its end position, which is indicated by the increase in motor current E. In order to detect the increase in motor current, the microprocessor will form an internal motor end signal as shown in FIG. 8b. After starting driving the motor, the signal at the input 64 of the microprocessor is ignored for a time period $T_w$, which equals the wake-up time (750 ms), as illustrated in FIG. 8b. Hereby memory is saved in the processor unit and the end position E is accurately determined without confusion by the start up pulse S. When the motor is driven, the processor unit 53 in step 95 checks by means of the motor-end signal if the motor reaches its end position. In the control step 95 of the flow chart in FIG. 5, the processor unit 53 checks at an incoming up command for the motor drive if the previous time also an up commando was received and so, if the previous time the end position was reached. If this end position had been reached the motor will not be actuated.

As long as the signal received by the receiver 50 is valid and no fully tilted blind position is reached, the step 94 continues to control the drive unit 55. If the signal becomes invalid or the fully tilted blind position is reached, the step 96 allows the processor unit 53 to calibrate the wake-up unit 54; after calibration, in the step 93 the detection unit 52 and the processor unit 53 are switched off and the receiver 50 returns to the sleep status.

The invention is not limited to the embodiment hereinabove referred to. The embodiment is merely incorporated to describe the invention by way of example. Within the scope of the invention a man ordinary skilled in the art may provide other constructions or different details.

The addressability, for example, may be left out in favour of a transmission element having a directionally focused emission beam. Then adjacent blind arrangements can be addressed separately by directing such transmission beam towards one arrangement only, provided that such emission beam has proper dimensions. Addressability may alternatively be used to control different functions, such as tilting and lifting, in the same blind arrangement.

Also the detection unit may be left out in favour of connection to a wired outside detection circuit thereby achieving freedom in location of the subject unit. The blind arrangement in accordance with the invention may further be provided with any accessory features, such as conventional (common or inter-related) control mechanisms. Such accessory features may also arrange for a day-light dependent operation or a remote control device that is wired to the receiver, in particular to the processor unit of the receiver.

As another example within the ordinary skill, the communication system of a remotely controlled blind arrangement in accordance with the invention may be embodied as a lift system; where the embodiment hereinabove referred to is described in relation to a tilt system, the lift system is concerned with lowering and raising slats or shades. Alternatively, the tilt system may be used with vertical blind arrangements. A skilled man will easily incorporate the communication system of a remotely controlled blind arrangement in accordance with the invention in any slatted, horizontal or vertical, or shade arrangements for purposes of obtaining tilt or lift features.

Finally, according to the invention the blind arrangement may additionally be provided with a manual operation equipment, such as tilt or lift means, use of which further reduces power consumption.

Table:
80 :=sleep status
81 :=wait temporarily
90 :=active status
91 :=switch on detection and processor units by wake-up unit
92 :=signal valid ?
93 :=switch off detection and processor units
94 :=control drive circuit including motor
95 :=signal handled or fully tilted position reached ?
96 :=calibrate wake-up unit by processor

We claim:

1. A remotely controlled blind arrangement comprising a head rail with an operating member for operating the blind arrangement, and a communication system with a transmitter and a receiver each provided with a supply unit, the transmitter being incorporated in a remote control device and the receiver, responsive to a signal from the transmitter to drive the operating member, comprising a detection unit, a processor unit and a wake-up unit for periodically switching the processor unit between an active status and a sleep status by means of a periodic wake-up signal, wherein, the processor unit periodically calibrates the wake-up unit to maintain a constant period wake-up signal.

2. The remotely controlled blind arrangement according to claim 1, wherein the processor unit comprises an output that is connected to an input of the wake-up unit comprising a capacitive element, for supplying a charging pulse to said capacitive element, the wake-up signal at the output of the wake-up unit being determined by the discharge time of the capacitive element, wherein in the calibrating step the processor unit determines the period of the wake-up signal and adjusts the width (Tc+nΔT) and/or the period of the charging pulse to maintain a predetermined period of the wake-up signal.

3. The remotely controlled blind arrangement according to claim 2, wherein the processor unit adjusts the width (Tc+nΔT) of the charging pulse.

4. The remotely controlled blind arrangement according to claim 2 or 3, wherein the input of the wake-up unit is connected to the control electrode of a first controllable switch, the capacitive element being with one terminal connected to the control electrode and with another terminal to a reference voltage, the output of the wake-up unit being connected to an output electrode of the first controllable switch.

5. The remotely controlled blind arrangement according to claim 4, wherein the output electrode of the first controllable switch is connected to a control electrode of a second controllable switch, the output electrode of which is connected to the control electrode of the first controllable switch.

6. The remotely controlled blind arrangement according to claim 1, 2, or 3 wherein the processor unit is adapted to disregard the signal of the transmitter when the blind has a fully tilted, fully deployed or fully retracted position.

7. The remotely controlled blind arrangement according to claim 6, wherein the processor unit determines the magnitude of the motor current of a motor and sets a memory element to indicate the maximum blind position when said magnitude is larger than a predetermined value, the processor unit, when the memory element has been set, only responding to those control signals causing a motor rotation away from the maximum blind position.

8. The remotely controlled blind arrangement according to claim 7 wherein the processor unit upon receiving of a control signal for driving the motor, measures the motor current after a predetermined time delay following switching on of the motor.

9. The remotely controlled blind arrangement according to claim 8, wherein the time delay corresponds to the wake-up time.

10. The remotely controlled blind arrangement according to claim 6 wherein, the processor unit upon receiving of a control signal for driving the motor, measures the motor current after a predetermined time delay following switching on of the motor.

11. The remotely controlled blind arrangement according to claim 10, wherein, the time delay corresponds to the wake-up time.

12. A remotely controlled blind arrangement comprising a head rail with an operating member for operating the blind arrangement, a motor operatively coupled to the operating member, and a communication system with a transmitter and a receiver each provided with a supply unit, the transmitter being incorporated in a remote control device and the receiver, responsive to a signal of the transmitter to drive the operating member, comprising a detection unit, and a processor unit adapted for periodically switching between an active status and a sleep status, wherein the processor unit is adapted to disregard the signal of the transmitter when the blind has a fully tilted, fully deployed, or fully retracted position, and wherein the processor unit upon receiving of a control signal for driving the motor, measures a magnitude of a motor current after a predetermined time delay following switching on of the motor.

13. A remotely controlled blind arrangement according to claim 12, wherein the processor unit determines the magnitude of the motor current and sets a memory element to indicate the maximum blind position when said magnitude is larger than a predetermined value, the processor unit, when the memory element has been set, only responding to those control signals causing a motor rotation away from the maximum blind position.

14. A remotely controlled blind arrangement according to claim 12, wherein the time delay corresponds to the wake-up time.

* * * * *